March 25, 1952  A. S. KROTZ  2,590,711
VARIABLE RATE SPRING ASSEMBLY
Filed Dec. 31, 1946  2 SHEETS—SHEET 1
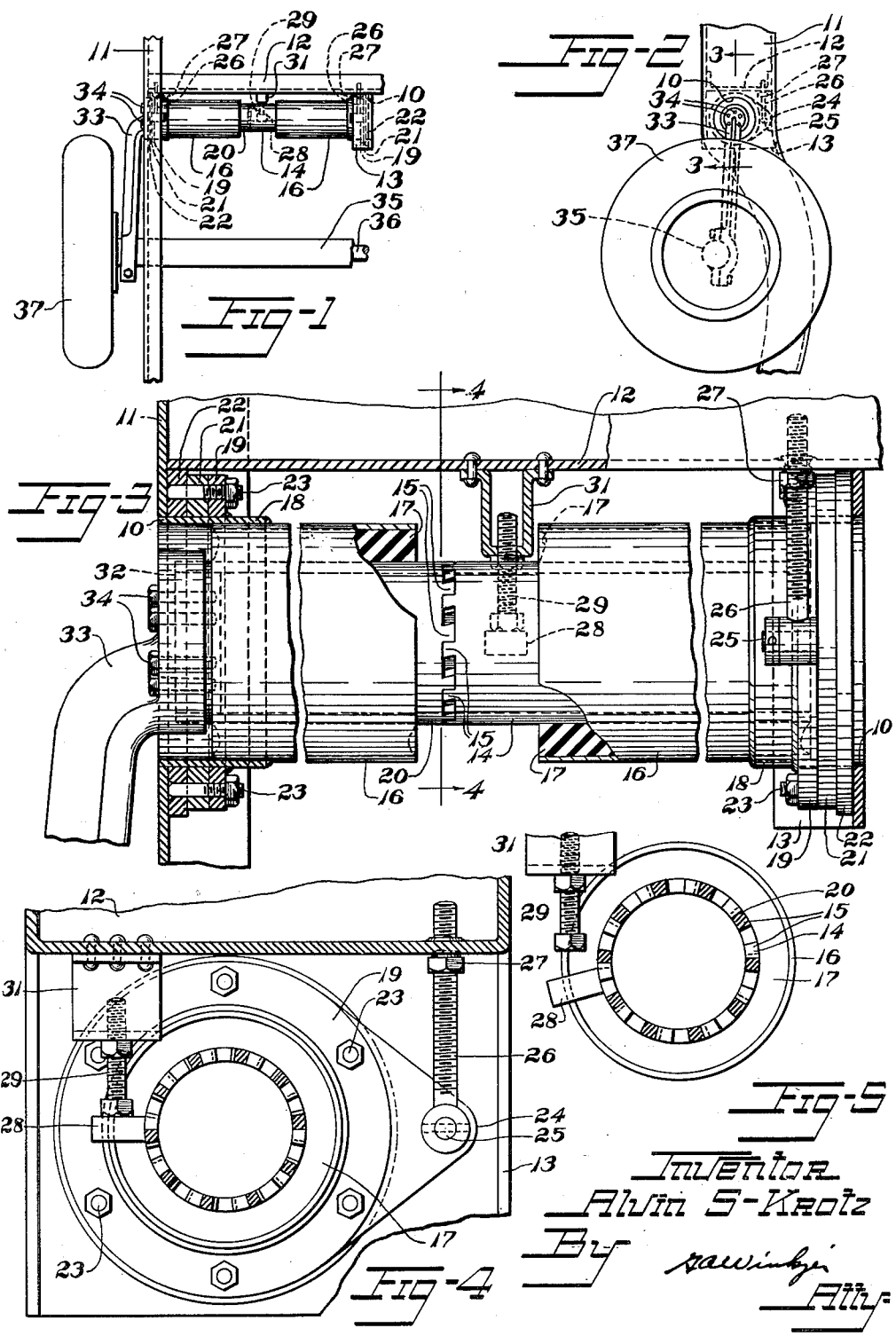
Inventor
Alvin S. Krotz March 25, 1952     A. S. KROTZ     2,590,711
VARIABLE RATE SPRING ASSEMBLY
Filed Dec. 31, 1946     2 SHEETS—SHEET 2
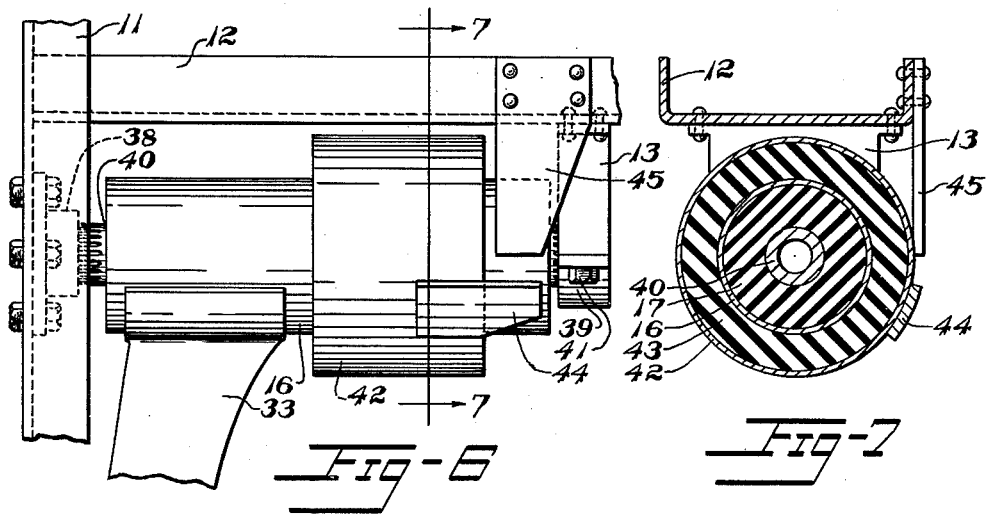
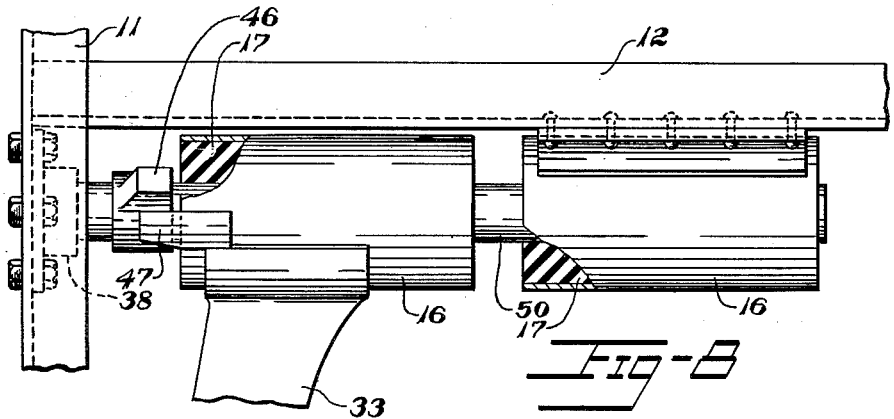
Inventor
Alvin S. Krotz Patented Mar. 25, 1952

2,590,711

UNITED STATES PATENT OFFICE 2,590,711

VARIABLE RATE SPRING ASSEMBLY

Alvin S. Krotz, Akron, Ohio, assignor to The B. F. Goodrich Company, New York, N. Y., a corporation of New York Application December 31, 1946, Serial No. 719,446

3 Claims. (Cl. 267—21)

This invention relates to spring assemblies and especially to vehicle suspensions. Many of the vehicles currently in operation carry loads of different weights. For cushioning of the light loads a soft springing action is desirable and for cushioning of the heavier loads a stiffer springing action is desirable. A spring assembly which would provide such a variable rate of springing action would find a wide application in suspensions for load-carrying vehicles such as freight trucks which often carry heavy loads to a point and return with light loads.

Objects of the invention are to provide an improved spring assembly that will be effective under the conditions discussed above; to provide a soft springing action for light suspended loads and a stiffer springing action for heavy suspended loads; to provide for adjustability of spring stiffness; to provide for quietness of operation; to provide absorption of shock and impact in all directions; to eliminate the necessity for lubrication; to provide lightness of structure and to provide for convenience of construction and installation.

More specific objects are to provide a plurality of bodies of rubber-like material with a connecting structure to attain the foregoing objects; to provide cushioning of the vehicle by stressing the bodies in torsional shear; to provide apparatus for engaging the bodies to stress them together in torsional shear and to provide apparatus for limiting the stress on the bodies.

These and other objects will be apparent from the following description, reference being had to the accompanying drawings in which:

Fig. 1 is a plan view of a vehicle suspension constructed in accordance with and embodying the invention, parts being broken away.

Fig. 2 is an elevation of the suspension shown in Fig. 1.

Fig. 3 is a section taken along line 3—3 of Fig. 2, parts being sectioned and broken away.

Fig. 4 is a section taken along line 4—4 of Fig. 3.

Fig. 5 is a section like Fig. 4 showing the position of the suspension with the shaft sections in working engagement.

Fig. 6 is a plan view of a modified construction, parts being broken away.

Fig. 7 is a section taken along line 7—7 of Fig. 6.

Fig. 8 is a plan view of a further modification, parts being broken away.

A vehicle suspension incorporating a spring assembly constructed in accordance with and embodying the invention is shown in Fig. 1 in which the vehicle has a chassis which comprises longitudinal members 11 and transverse members 12. A bracket member 13 is mounted on the transverse member 12 and disposed in such a position that a spring assembly may be mounted between the bracket and the longitudinal member 11 in a position transverse of the chassis. The bracket 13 and the longitudinal member 11 have co-axial apertures 10, 10 in which shafts 14 and 20 respectively are disposed in end to end alignment. The abutting ends of the shafts 20 and 14 have inter-engaging teeth 15 disposed in a lost-motion connection in a manner such that limited relative rotation of the shafts 20 and 14 is permitted.

A sleeve 16 is disposed about each shaft 14 and 20 and an annular elastic body of resilient rubber-like material 17 is interposed between and bonded by suitable means such as vulcanization to the shaft and sleeve. Each sleeve 16 is mounted fixedly in a shell 18 which is mounted rotatably in the apertures 10, 10 in the longitudinal member 11 or in the bracket member 13. The shell member 18 has a ring member 19 mounted fixedly thereto at the outer circumference.

Adjusting ring members 21 and shim members 22 are mounted between the ring members 19 and the bracket 13 and the longitudinal member 11. The shim members 22 are disposed in such a manner as to prevent axial movement of the spring assembly. Studs 23 are mounted fixedly in the shim members 22 and disposed in apertures in the ring member 21 and adjusting member 19 to prevent relative rotary movement of the members. Each adjusting ring member 21 has a projection 24 extending radially from the ring member. A pin 25 is mounted on the projection 24 and a threaded adjusting stud 26 is mounted rotatably on the pin and extends through an aperture in the transverse member 12. A nut 27 is threaded on the adjusting stud 26 to restrict movement of the stud relative to the transverse member 12.

The portion of the shaft 14 adjacent the bracket 13 has a lug 28 projecting radially from the shaft to restrict rotation of the shaft by engagement with a bolt 29 which extends into the path of rotation of the lug 28 and is threaded in a channel member 31 mounted on the transverse member 12.

A disk member 32 is inserted in the end of the shaft portion 20 adjacent the longitudinal member 11 and mounted fixedly thereto. One end of an arm 33 is mounted on the disk member 32 by studs 34. The other end of the arm 33 is mounted on an axle housing 35 which encases an axle 36 upon which a wheel 37 of the vehicle is mounted. The suspension is shown for one wheel, however, the other wheels of the vehicle may be similarly mounted.

In operation, as weight is added to the chassis the arm 33 will tend to turn in a counter-clockwise direction as shown in Fig. 2 which will urge the shaft 20 adjacent the longitudinal member 11 in a counter-clockwise direction. The sleeve 16 and the shell 18 adjacent the longitudinal member 11 are prevented from turning by the adjusting ring member 21 which is secured to the transverse member 12 by the adjusting stud 26. The relative rotary movement of the shafts 20 and 14 and the shell 16 will stress the body of rubber-like material 17 in torsional shear which will cushion the vehicle.

During the initial deflection of the body of rubber-like material 17 adjacent the longitudinal member 11 the shaft 20 adjacent the bracket 13 will not be affected as the space between the teeth 15 of the shafts 14 and 20 will permit relative rotary movement of the shafts. When a load has been applied to the vehicle which will cause the body of rubber-like material to deflect sufficiently, the teeth 15 of the shafts 14 and 20 will mesh and the shaft 14 adjacent the bracket 13 will be urged in a counter-clockwise direction. As the shaft 14 is turned the other body of rubber-like material 17 will be stressed in torsional shear and offer resistance to turning of the shaft. The resultant cushioning action with the two bodies of resilient material stressed in torsional shear in parallel will be stiffer than the cushioning action provided by one body.

The body of rubber-like material 17 which is adjacent the bracket 13 may be preloaded in order that the engagement of the shaft 14 will have an appreciable effect on the cushioning action. Preloading may be effected by turning the lug 28 in a counter-clockwise direction as shown in Fig. 4 and holding the shaft at that position by means of the adjusting bolt 29 which is inserted in the channel member 31.

When the force required to turn the portion of shaft 14 adjacent the bracket 13 exceeds that required to preload the body of rubber-like material 17 adjacent the bracket 13 the lug will be turned in a counter-clockwise direction and leave the adjusting bolts 29 as shown in Fig. 5. Preloading may also be accomplished by moving the nut 27 on the threaded adjusting stud 26 to move the projection 24 in a clockwise direction while the lug is in engagement with the bolt 29.

The height of the wheel 37 with relation to the chassis may be controlled by turning the adjustment nut 27 which is threaded on the stud 26 connected to the adjusting ring 21 which is adjacent the longitudinal member 11. By turning this adjusting nut 27 to urge the projection 24 in a clockwise direction as shown in Fig. 2, the arm 33 may be moved in a clockwise direction and the chassis raised with respect to the wheel 37. Likewise by adjusting the stud 26 to allow the projection 34 to move in a counter-clockwise direction toward the transverse member 12 the chassis may be lowered with respect to the wheel 37.

As the load upon the chassis is reduced the shafts 14 and 20 will tend to turn in a clockwise direction and the lug 28 will engage the bolt 29 whereupon the two portions of the shaft 20 and 14 will rotate relative to each other and the body of rubber-like material 17 which is adjacent the bracket 13 will not cushion the vehicle. The vehicle then will be suspended on one body of rubber 17 and the deflection per unit weight will be great providing a soft springing action which is desirable for light loads.

A modified construction is shown in Fig. 6 and Fig. 7 in which one end of a shaft 40 is mounted in a flanged collar 38 which is mounted on the longitudinal member 11. The other end of the shaft 40 fits in a slot in the bracket 13 and is held there by a strap member 39 mounted on the bracket by bolts 41. The end portions of the shaft 40 are serrated and the abutting surfaces of the flanged collar 38 and the bracket slot have serrations for engagement with the shaft serrations to prevent rotation of the shaft 40 with respect to the chassis. A sleeve 16 is disposed about the shaft 40 and a body of rubber-like material 17 interposed between and mounted on the shaft and sleeve. An arm 33 connects sleeve 16 with a wheel assembly 37 such as shown in Fig. 1. An outer sleeve 42 is disposed about the sleeve 16 and an outer body of rubber-like material 43 is interposed between and mounted on the sleeve 16 and outer sleeve 42. A lug 44 is mounted on the outer sleeve 42 and a stop member 45 is mounted on the transverse member 12 of the chassis and disposed in a lost-motion connection such that rotation of the outer sleeve 42 may be restricted by the engagement of the lug 44 with the stop member 45.

In operation, the body of rubber-like material 17 which is disposed between the shaft 40 and the sleeve 16 will be stressed in torsional shear and supply cushioning for the vehicle. Under heavy loads the sleeve 16 will be rotated in a counter-clockwise direction an amount that will cause the lug 44 to engage the stop member 45. Then upon additional counter-clockwise rotation the sleeve 16 caused by additional load upon the vehicle the outer body of rubber-like material 43 will be stressed in torsional shear also. The additional resistance to deflection set up by the outer body of rubber-like material 42 will cause a stiff springing action which is desirable with heavy loads.

When the load is reduced the resilient properties of the bodies of rubber-like material 17 and 43 will urge the sleeve 16 in a clockwise direction and the outer sleeve 42 will be moved in a clockwise direction an amount sufficient to disengage the lug 44 and the stop member 45. Therefore, with a light load the vehicle will be cushioned only by the inner body of rubber-like material 17 which will provide a soft cushioning action.

Variations in the cushioning properties of this spring assembly may be obtained by using a more resilient material or a less resilient material in the body of rubber-like material. Also the angle through which the outer sleeve 42 turns before it engages the stop member 45 may be changed by removing the shaft 40 from the flanged collar 38 by removing the opposite end of the shaft 40 from the slot in the bracket 13. Then if the shaft 40 is turned in a counter-clockwise direction as seen in Fig. 7 and reinserted in the collar 38 and bracket 13 the angle through which the sleeve 42 turns before engagement will be decreased. Conversely if the shaft 40 is turned clockwise as seen in Fig. 7 and reinserted the angle through which the sleeve turns before engagement will be increased.

Another modification is shown in Fig. 8. A flanged collar 38 is mounted on the longitudinal member and a shaft 50 of the spring assembly is mounted rotatably in the flanged collar. The shaft 50 is disposed in a position transverse of the chassis and has a pair of sleeves 16, 16 mounted axially thereabout with bodies of rubber-like material 17, 17 interposed between the shaft 50 and the sleeves. One sleeve 16 is mounted fixedly on the transverse member 12 of the chassis and the other sleeve 16 is connected to the wheel assembly by an arm 33. A lug 46 is mounted on the shaft 50 and a projection 47 on the sleeve 16 which is not fixedly mounted on the transverse member 12 are disposed in a lost-motion connection such that relative rotary movement of the movable sleeve 16 with respect to the shaft 50 is limited by the engagement of the lug 46 and the projection 47.

In operation, as the arm 33 is moved relative to the chassis by an increase in the load on the chassis the sleeve 16 to which the arm 33 is attached will be rotated causing the body of rubber-like material 17 and the shaft 50 to rotate. Under a light load both the bodies of rubber-like material 17, 17 will be stressed in torsional shear in series and the vehicle will be provided with soft springing action. As the load is increased, the bodies of rubber-like material 17, 17 will be stressed and deflect to such an extent that the stop projection 47 will engage the lug 46 causing the body of rubber-like material 17 adjacent the sleeve 16 to provide all the cushioning for the wheel suspension assembly 37 providing a stiff springing action.

The characteristics of this spring assembly may also be changed by substituting more or less resilient material for the bodies of rubber-like material 17, 17. The modification shown in Fig. 8 is for the suspension of one wheel of the vehicle and the suspension for the other wheels may be similarly constructed.

Variations may be made without departing from the invention as it is defined in the following claims.

I claim:

1. A spring suspension comprising a structure, a shaft journaled in said structure for relative rotation thereto, a pair of axially spaced-apart cylindrical members about said shaft, one of said cylindrical members being mounted on said structure, a radially extending arm mounted on the other of said cylindrical members, bodies of resilient rubber-like material mounted between said shaft and said members for resisting relative rotation of said shaft and said members in cylindrical shear for cushioning rotative movement of said arm relative to said structure, a lug mounted on said shaft and projecting radially therefrom and a stop element projecting from the member upon which said arm is mounted into lost-motion relation with respect to the lug for twisting both said bodies during the rotative movement of said arm relative to said structure through the lost-motion range and for twisting only the body having the cylindrical member mounted on said structure during the rotative movement of said arm relative to said structure after engagement of said lug and said stop element for increasing the resistance to rotative movement of said arm relative to said structure.

2. A spring assembly comprising a structure, a shaft member disposed for rotation relative to said structure, a pair of axially spaced-apart sleeve members about said shaft, bodies of resilient rubber-like material mounted between said sleeve members and said shaft member, one of said sleeve members being mounted on said structure, lost-motion connecting means between the other of said sleeve members and said shaft member comprising a radially extending lug mounted on said shaft member and an axially projecting element disposed non-rotatively with respect to the other of said sleeve members in angularly spaced lost-motion relation to said lug in the unstressed condition of the spring assembly and engageable therewith upon relative rotative movement of said shaft member and said structure for limiting the twisting of one of said bodies of resilient rubber-like material while permitting continued relative rotation of said shaft and said structure and continued twisting of the other of said bodies of resilient rubber-like material.

3. A spring suspension comprising a plurality of sleeves disposed in axially spaced relation about a shaft providing pairs of radially opposed surfaces, a radially extending arm mounted on one of said sleeves, bodies of resilient rubber-like material mounted between the opposed surfaces of said pairs of radially opposed surfaces for cushioning rotative movement of said arm about the axis of said shaft, a lug mounted on said shaft and another engaging element projecting from the sleeve on which said arm is mounted into angularly spaced lost-motion relation with respect to the lug in the unstressed condition of the spring and engageable therewith upon rotative movement of said arm through the angle of the lost-motion range beyond for twisting said bodies together while said arm is turned through one of the ranges and for twisting one of said bodies relative to the other while said arm is turned through the other of the ranges.

ALVIN S. KROTZ.

REFERENCES CITED

The following references are of record in the file of this patent:

UNITED STATES PATENTS

| Number | Name | Date |
| --- | --- | --- |
| 2,069,270 | Piron | Feb. 2, 1937 |
| 2,167,508 | Herold | July 25, 1939 |
| 2,216,455 | Piron | Oct. 1, 1940 |
| 2,270,572 | Woolson et al. | Jan. 20, 1942 |
| 2,393,183 | Parker | Jan. 15, 1946 |
| 2,409,501 | Krotz | Oct. 15, 1946 |
| 2,477,187 | Lanchner | July 26, 1949 |